United States Patent
Hui et al.

(10) Patent No.: US 11,290,811 B2
(45) Date of Patent: Mar. 29, 2022

(54) HELMET FOR COMMUNICATION IN EXTREME WIND AND ENVIRONMENTAL NOISE

(71) Applicant: BITwave Pte Ltd, Singapore (SG)

(72) Inventors: Siew Kok Hui, Singapore (SG); Au Ming, Singapore (SG); Ng Jiefeng Bryan, Singapore (SG)

(73) Assignee: BITWAVE PTE LTD., Singapore (SG)

( * ) Notice: Subject to any disclaimer, the term of this patent is extended or adjusted under 35 U.S.C. 154(b) by 0 days.

(21) Appl. No.: 17/162,645

(22) Filed: Jan. 29, 2021

(65) Prior Publication Data

US 2021/0243523 A1    Aug. 5, 2021

Related U.S. Application Data

(60) Provisional application No. 62/969,039, filed on Feb. 1, 2020.

(51) Int. Cl.
| | |
|---|---|
| *H04R 1/46* | (2006.01) |
| *H04B 1/3827* | (2015.01) |
| *H04R 1/08* | (2006.01) |
| *H04R 1/10* | (2006.01) |

(52) U.S. Cl.
CPC .............. *H04R 1/46* (2013.01); *H04B 1/385* (2013.01); *H04R 1/083* (2013.01); *H04R 1/1075* (2013.01); *H04B 2001/3866* (2013.01); *H04R 2201/10* (2013.01); *H04R 2460/13* (2013.01)

(58) Field of Classification Search
CPC ........ H04R 1/46; H04R 1/083; H04R 1/1075; H04R 2201/10; H04R 2460/13; H04B 1/385; H04B 2001/3866
See application file for complete search history.

(56) References Cited

U.S. PATENT DOCUMENTS

2018/0336874 A1\* 11/2018 Hui ........................ G10K 11/16

\* cited by examiner

*Primary Examiner* — Andrew L Sniezek
(74) *Attorney, Agent, or Firm* — Amin, Turocy & Watson, LLP

(57) ABSTRACT

A protective headgear including a multi-sensor array having a bone conduction microphone, air conduction microphone, signal processor, and speakers; a signal processor that processes vibration signal data and tonal signal data to produce combined data representative of the vocal communication to substantially reduce or eliminate noise; and a method of applying a signals optimized combination algorithm to optimize the output by intelligently combining the outputs from the two different types of sensors for both working in a noisy environment and quiet environment.

20 Claims, 16 Drawing Sheets

HELMET FOR COMMUNICATION IN EXTREME WIND AND ENVIRONMENTAL NOISE

RELATED APPLICATION

The subject patent application claims priority to U.S. Provisional Patent Appln. No. 62/969,039, filed Feb. 1, 2020, entitled "Multi-Sensor Array Algorithm and Construction for Helmet Communication in Extreme Wind Noise and Environmental Noise Situation". The entirety of the aforementioned application is hereby incorporated by reference herein.

TECHNICAL FIELD

The subject application is in the field of speech communication and speech recognition which relate to hands-free Bluetooth headset communication systems embedded with multi-sensors for audio signal acquisition, echo cancellation, interference sound cancellation, and extreme wind noise and environmental noise resistance, while having overall noise cancellation capabilities, pertaining particularly to methods and apparatus that facilitate such speech communication in hostile noisy environments.

BACKGROUND

The conventional Bluetooth helmet headset communicator uses a close talking bi-directional noise cancellation microphone or boom microphone with a very thick wind filter. This approach helps to cut down on environmental noise and wind noise. However, it faces a more severe problem when the device is used in fast speed rides where wind noise is the issue such as snowmobiles, motorcycles, fast open top vehicles, all-terrain vehicles (ATVs), gliders, fast surface craft, light vessels, etc. due to the directional microphones being very susceptible to wind noise. In this case, an extremely thick wind filter can be implemented. While such designs provide a voice input channel to the headset, the boom of the microphone imposes an awkward industrial design issue to the overall appearance of the headset. Also, the design of a boom microphone normally involves movable mechanical parts. This affects device durability and manufacturing cost. In many situations, a boom microphone is not practical.

Recently, a small array has been proposed to be used in mobile devices such as headsets with minor success. The small array consists of two omni-directional microphones spaced at about 2.1 cm apart for a 16 KHz sampling frequency. For an 8 KHz sampling rate, the spacing between the microphones needs to be doubled. The small array forms a beam that points to the user's mouth. It can also form an area on its back plane to nullify an interference source. However, the small array is only effective for a near field source. Further, the 2.1 cm spacing requirement can also be a challenge for small mobile devices, e.g., the bottleneck of identification issues. This small array is also extremely susceptible to wind noise.

Bone conduction microphones can be used to help solve both the environmental noise and wind noise issues. However, for the bone conduction microphone to work well, it should come into good contact with the user's skin surface in the head area. If the contact is poor, many signals can be lost leading to poor communication quality. If there is no contact, the bone microphone will fail completely. However, maintaining good contact can become very intrusive and can cause significant discomfort to the user at the contact point of the user's skin surface. It may also defeat the ease of use of the system. Therefore, it would be desirable to have a mounting that is somehow not intrusive while providing excellent contact with the user surface.

Further, to minimize external noise from getting into the bone acoustic sensor, it is desirable to isolate the bone acoustic sensor from this noise source through any direct or indirect mechanical vibration, etc., especially when mounted into any helmet where the user constantly generates mechanical vibration noise, such as external noise impact on the helmet, walking, eating, etc.

Further usage of a bone conducting sensor is not sensitive to high frequency speech, so the speech quality may be degraded.

The above-described context with respect to conventional microphones is merely intended to provide an overview of current technology and is not intended to be exhaustive. Other contextual description, and corresponding benefits of some of the various non-limiting embodiments described herein, will become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

The present application provides various embodiments for a wearable array using two different types of sensors, a unique signal processing method and a unique structure to effectively suppress wind noise and environmental noise. The wearable array will enable the device to be used in extremely windy condition and hostile noisy condition such as riding a bike, snowmobile, ATV or even skydiving.

An example embodiment of the present application provides an apparatus integral with, or attachable to, a protective headgear, comprising a cushioned bendable material integral with, or attachable to, an inside of a top part of the protective headgear; a bone conduction microphone, at a first position within the cushioned bendable material, that obtains vibration signal data representative of a vibration signal associated with vibration of a user vertex area of skull bone of a user, wherein the user vertex area of skull bone is located at a top part of skin of a head of the user that contacts or substantially contacts the bone conduction microphone, and wherein the vibration signal results from vocal communication of the user; an air conduction microphone integral with, or attachable to, the protective headgear at a second position away from the first position of the bone conduction microphone by at least a defined distance, wherein the air conduction microphone obtains tonal signal data representative of a tonal signal, received by the air conduction microphone via air and representative of the vocal communication of the user; and a signal processor that processes the vibration signal data and the tonal signal data, to produce combined data representative of the vocal communication that substantially reduces or eliminates at least one of a first noise associated with the vibration signal data or a second noise associated with the tonal signal data.

Another example embodiment of an apparatus integral with, or attachable to, a protective headgear relates to an apparatus, wherein the apparatus comprises a wind sensor that senses wind signal data representative of an air noise signal resulting from incident air flow on the protective headgear, and wherein the signal processor processes the vibration signal data, the tonal signal data, and the wind signal data to produce the combined data representative of the vocal communication that substantially reduces or eliminates at least one of the first noise associated with the vibration signal data, the second noise associated with the tonal signal data, or a third noise associated with the wind signal data.

Another example embodiment of an apparatus integral with, or attachable to, a protective headgear relates to an apparatus, wherein the second position is toward a front of the protective headgear relative to the first position by at least the defined distance, wherein, at the first position within the cushioned bendable material at the inside of the top part of the protective headgear, the bone conduction microphone is substantially isolated from other vibrational signals, wherein the other vibration signals comprise signals resulting from wind impacting the headgear or from external environment sound generated outside of the headgear impacting the headgear, and wherein the external environment sound comprises motor sound generated by a motor or engine.

Another example embodiment of an apparatus integral with, or attachable to, a protective headgear relates to an apparatus, wherein a radio frequency transmitter to transmit the vocal communication by the user to another device; and a radio frequency receiver to receive other communications from the other device, wherein the other device is a user equipment or Internet of Things device.

Another example embodiment of an apparatus integral with, or attachable to, a protective headgear relates to an apparatus, wherein the position of the bone conduction microphone within the cushioned bendable material and the bone conduction sensor facing the top part of the head corresponding to the user vertex isolates the bone conduction microphone from interference from the radio frequency transmitter or the radio frequency receiver.

Another example embodiment of an apparatus integral with, or attachable to, a protective headgear relates to an apparatus, wherein a first speaker that outputs a first audio signal received from the signal processor representative of first audio for a first region associated with a left ear associated with the head; and a second speaker that outputs a second audio signal from the signal processor representative of second audio for a second region associated with a right ear associated with the head.

Another example embodiment of an apparatus integral with, or attachable to, a protective headgear relates to an apparatus, wherein, prior to producing the combined signal, a gain equalization is applied to the bone conduction microphone and the air conduction microphone to ensure a consistency of gain of respective outputs with respect to one another.

Another example embodiment of an apparatus integral with, or attachable to, a protective headgear relates to an apparatus, wherein the signal processor comprises an acoustic echo canceller that removes or substantially removes, from the combined signal, echo signals that result from acoustic coupling between at least one of the bone conduction microphone and a speaker that renders the vocal communication of the user, or the air conduction microphone and the speaker.

Another example embodiment of an apparatus integral with, or attachable to, a protective headgear relates to an apparatus, wherein the cushioned bendable material comprises at least one of at least one rubberized foam layer or at least one silicon casing layer.

Another example embodiment of an apparatus integral with, or attachable to, a protective headgear relates to an apparatus, wherein the vibration signal data is represented as a first fast fourier transform of the vibration signal, wherein the tonal signal data is represented as a second fast fourier transform of the tonal signal, and wherein the signal processor processing the vibration signal data and the tonal signal data to produce the combined data comprises the signal processor determining whether a first running average energy of the vibration signal is greater than a second running average energy of the tonal signal.

Another example embodiment of an apparatus integral with, or attachable to, a protective headgear relates to an apparatus, wherein the signal processor processing the vibration signal data and the tonal signal data to produce the combined data further comprises, in response to the first running average energy being determined to be greater than the second running average energy, applying a non-linear Fuzze function of the second running average energy divided by the first running average energy.

Another example embodiment of an apparatus integral with, or attachable to, a protective headgear relates to an apparatus, wherein the signal processor processing the vibration signal data and the tonal signal data to produce the combined data further comprises, in response to the first running average energy being determined to be less than the second running average energy, applying a non-linear Fuzze function of the first running average energy divided by the second running average energy.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Figure 1:
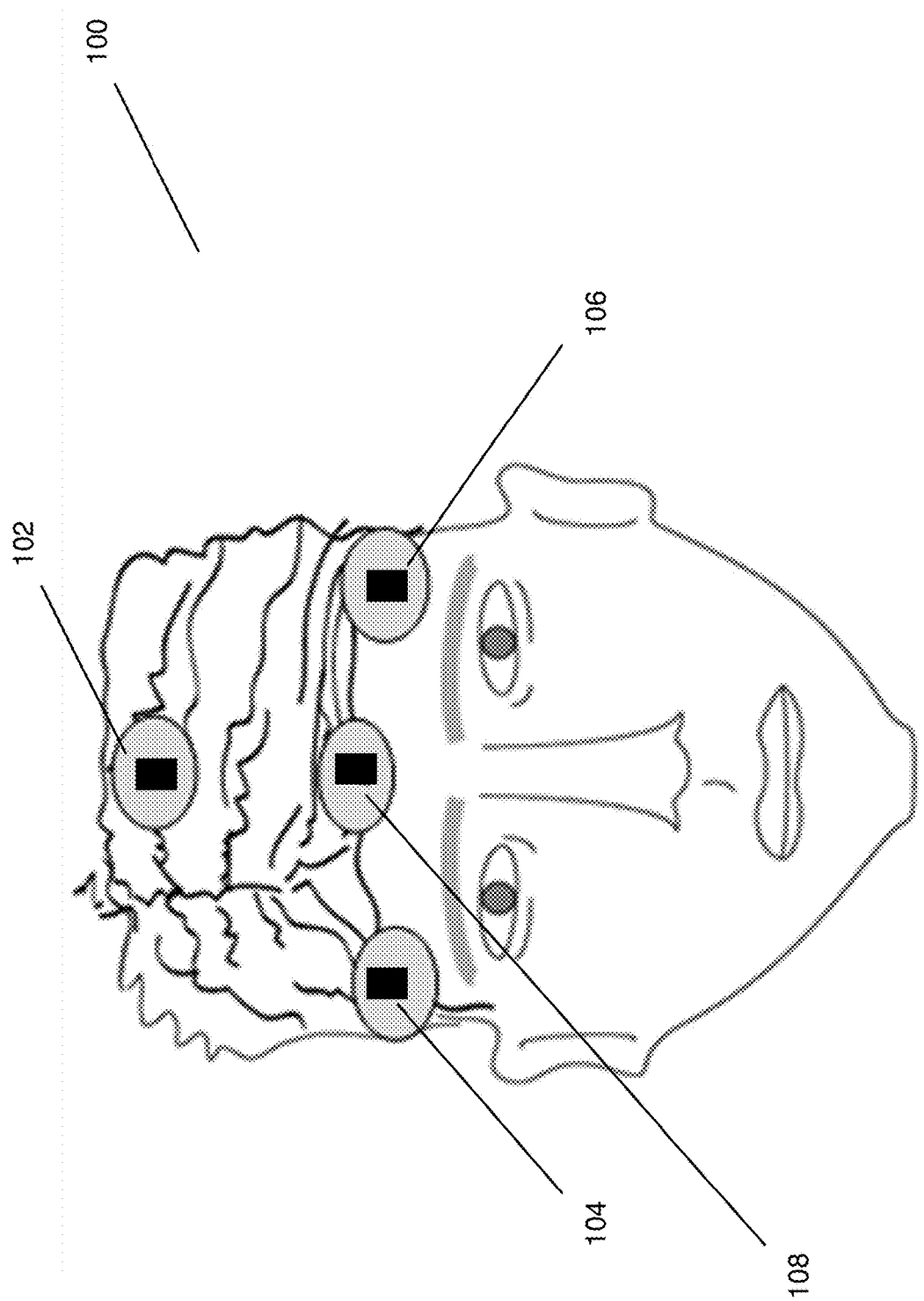
FIG. 1 illustrates the possible locations of the bone conduction sensor.

Referring to FIG. 1, considering variations and alternative embodiments of a bone conduction microphone, it is possible that a vibration generating means could be secured above the skin to any of the skull bones on a user for being vibrated to transmit such vibrations through the bones of the skull to stimulate the inner ear to create the perception of sound in the user.

In this regard, vibration generating means are adapted to be in contact above the skin for receipt of a signal by electromagnetic coupling from an output transmitter for causing vibration of the skull. Vibration generating means include means for securing the vibration generating means to a skull bone of the user.

FIG. 1 illustrates the areas of the user's skull 100 where a speech signal can be picked up by a bone conduction sensor. For helmet communication, with one or more of the various embodiments of the subject application, a structure can be easily installed in a helmet to ensure that a bone acoustic sensor will effectively come into contact with the user's vertex 102.

Although the vertex 102 on the top of the skull is preferred, other skull bones of a user may be utilized including the right temple 104, the left temple 106, or the forehead 108. In one embodiment, direct bone transmission is used, which enables hearing to be maintained via a system independent of air conduction and the inner ear although integrated with an air conduction system.

Figure 2:
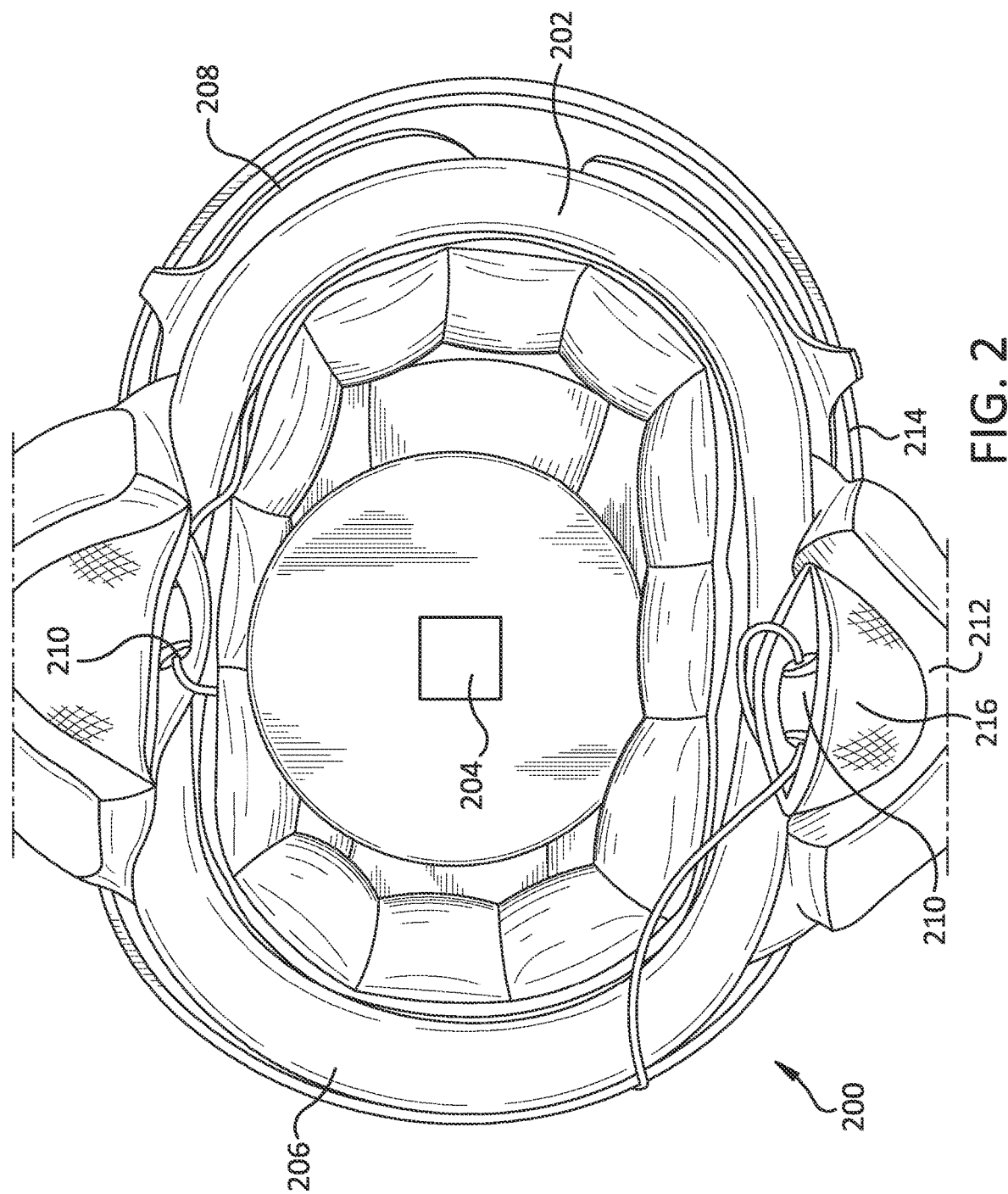
FIG. 2 illustrates the mounting of a multi-sensor array in a typical helmet.

Referring to FIG. 2, there is illustrated a combination head-protective helmet 200 including an air conduction microphone 202 and a bone conduction microphone 204 mounted on the helmet which combination is the first embodiment of the present application and is beneficial for using a mobile phone in hands-free mode, operating any wireless communication devices, or communication in the intercom mode between a plurality of users. It will be further understood that the head-protective helmet 200 includes, inter alia, a transceiver (not shown in FIG. 2), and that the transceivers mounted on the helmet worn by the user receive and transmit voice communications.

It will be understood, generally, that the head-protective helmet 200 illustrated in FIG. 2 may include a transceiver (not shown), transceiver circuitry (not shown) residing in the space suitably fastened between a cushioned bendable material 206 and the inner surface of the internal impact cap 208, a bone conduction microphone 204, an air conduction microphone 202, speakers 210 shown in FIG. 2 as being mounted on each ear cup 212, and a suitable antenna (not shown) residing internally of the head-protective helmet 200 between the cushioned bendable material 206 and the internal impact cap 208 as can be best understood by referring to FIG. 2.

The ear cup 212 may include a suitable rigid outer shell 214 and a suitable plastic foam ring 216 residing interiorly of and suitably secured to the inner surface of the outer shell 214. It will be understood generally from FIG. 2 that the ear cup 212, and thereby the speaker 210, are mounted to the head-protective helmet 200, particularly the internal impact cap 208, towards the side of the face of the user (FIG. 1). Such mounting of the ear cup 212 can be provided, as shown in FIG. 3. As may be noted from FIG. 3, the bone conduction microphone 204 of the head-protective helmet 200 is mounted to the internal impact cap 208 to place the bone conduction microphone 204 in conduction or communication with the vertex of the user, the air conduction microphone 202 in voice communication with the mouth of the user, and the speaker 210 in voice communication with the ear of the user. The cushioned bendable material 206 provides insulation and impact absorbing mounting for the bone conduction microphone 204, the air conduction microphone 202, and speaker 210.

Figure 3A:
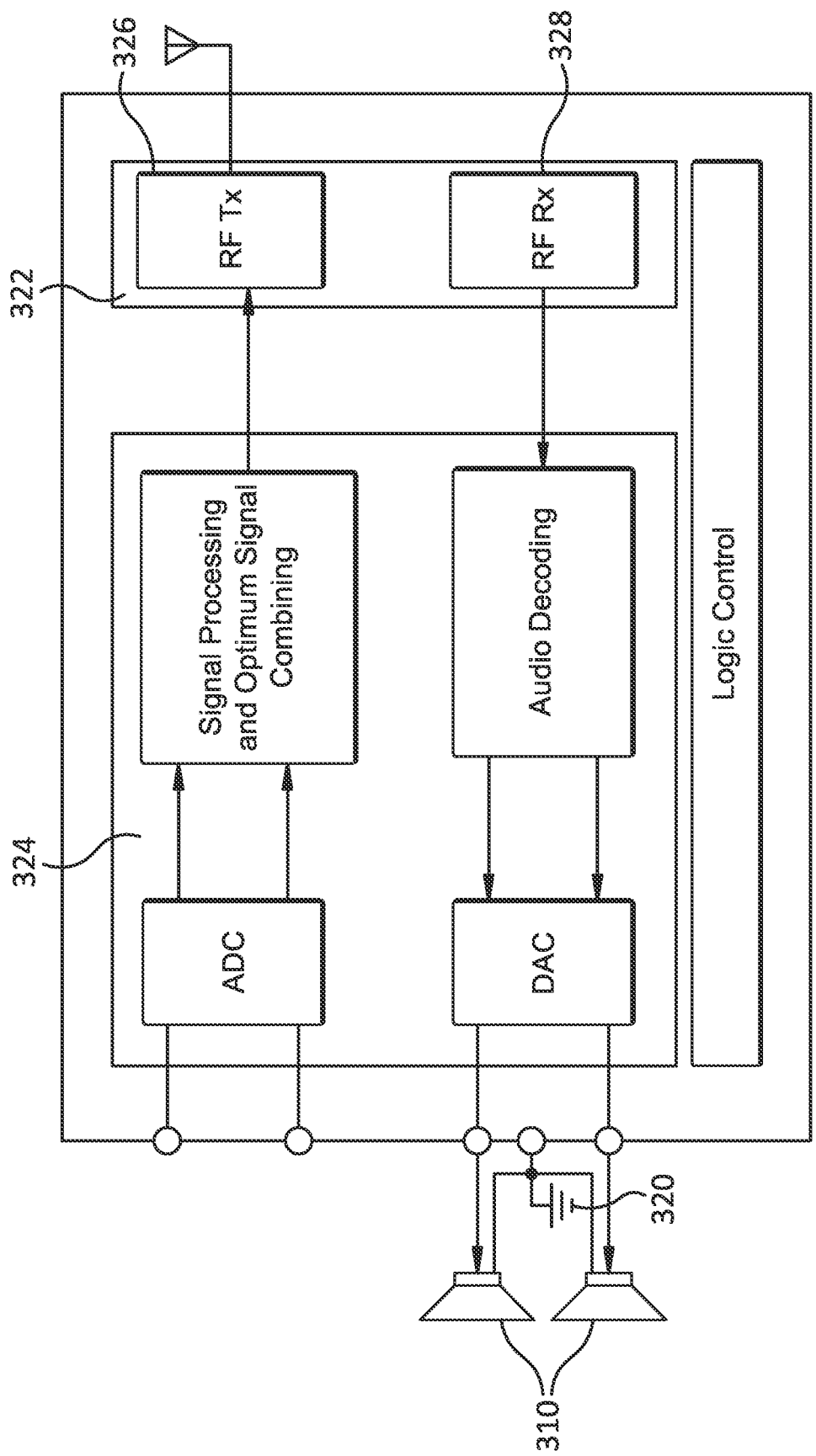
FIG. 3a illustrates the overall system block diagram.
Figure 3B:
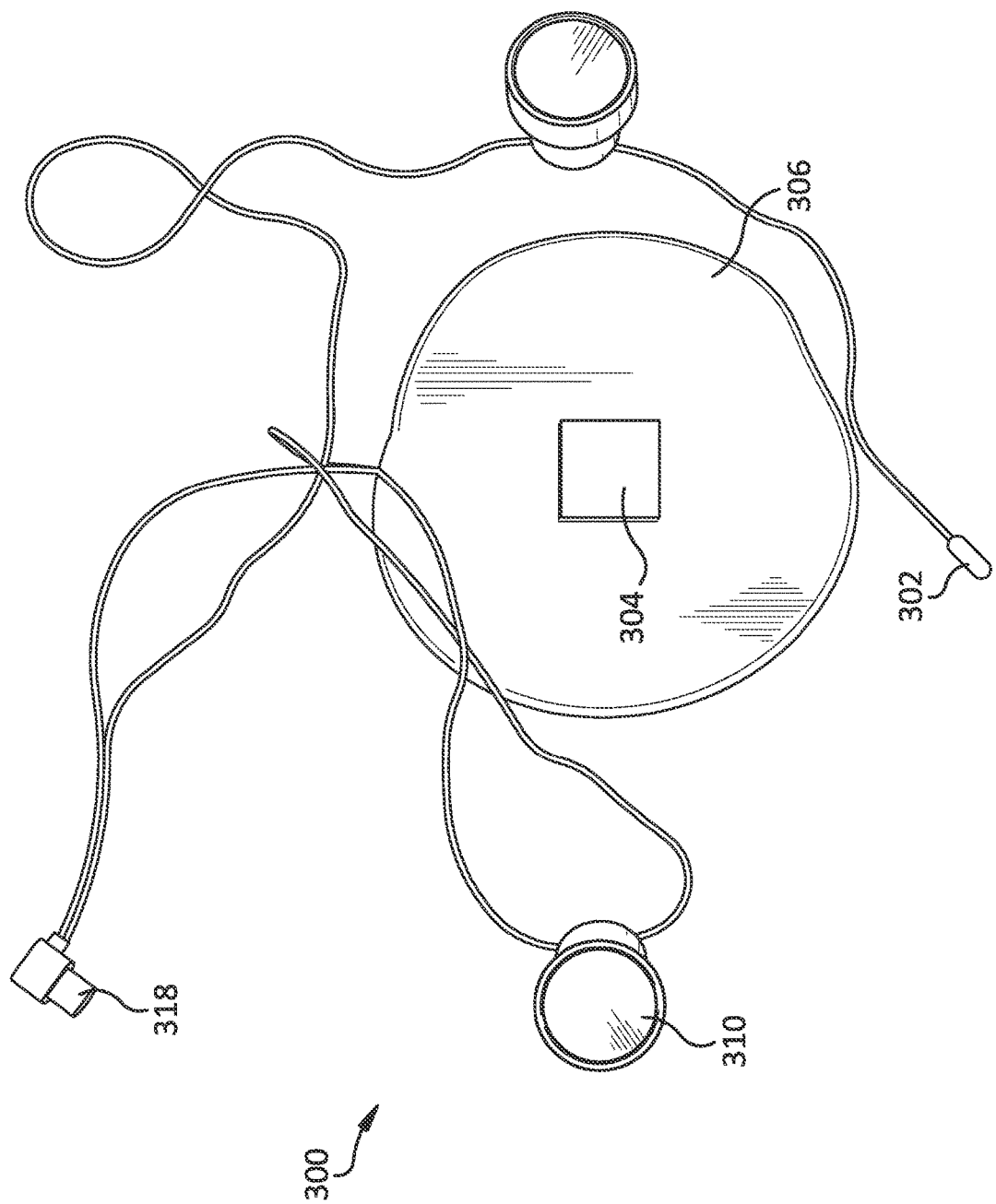
FIG. 3b illustrates a diagram of the general structure of the multi-sensor array.

Referring to the non-limiting example embodiments of FIGS. 3a and 3b, the bone conduction microphone 304, the air conduction microphone 302, and speaker 310 are suitably connected to the transceiver 322 and transceiver circuitry by suitable leads 318. As can be understood from FIG. 3, the multi-sensor array 300 may further include a suitable battery 320 residing in a recess formed in the outer portion of the cushioned bendable material 306 of the internal impact cap (not shown); battery 320 can be suitably connected to the transceiver 322 by leads 308 to provide energy to the transceiver 322, bone conduction microphone 304, air conduction microphone 302, and speakers 310.

Referring again to FIGS. 3a and 3b, there is illustrated diagrammatically a further embodiment of the present application which includes the above-described combination head-protective helmet and multi-sensor array 300 mounted thereon, in addition includes the bone conduction microphone 304, the air conduction microphone 302, and speaker 310 as being worn by the user, and which was described above as being for relatively long-range communications between users. It will be understood that in this embodiment is a signal processor 324 that processes the vibration signal data and the tonal signal data, to produce combined data representative of the vocal communication that substantially reduces or eliminates at least one of a first noise associated with the vibration signal data or a second noise associated with the tonal signal data.

The combination of an air conduction microphone 302 and a bone conduction microphone 304 provide the highest possible level of speech intelligibility and speech quality in both very noisy environments and also in quiet and calm conditions. Some low frequency signals are categorized as wind noise while other intrusive sounds are the modulation recognition higher than characteristic frequency being talk. The system described in FIG. 3 hides the wind noise in a sound signal effectively.

A bone conduction microphone 304, at a first position within the cushioned bendable material, obtains vibration signal data representative of a vibration signal associated with vibration of the user's vertex area of skull bone. The user vertex area of skull bone is located at a top part of skin of a user's head that contacts or substantially contacts the bone conduction microphone 304. The vibration signal results from vocal communication of the user. The bone conduction microphone 304 is extremely sensitive. Therefore, it is extremely susceptible to radio frequency (RF) interference. A bone conduction sensor amplifier design places the bone conduction sensor away from the transceiver 322 RF source relative to the RF interference, so as to significantly reduce RF interference and to provide a clean signal output to a processor board. The transceiver 322 comprises a radio frequency transmitter 326 that transmits the vocal communication of the user to another device and a radio frequency receiver 328 that receives other communications from other devices. The other devices can be user equipment or Internet of Things devices.

An air conduction microphone 302 is at a second position away from the first position of the bone conduction microphone. The air conduction microphone 302 obtains tonal signal data representative of a tonal signal, received by the air conduction microphone via air and representative of the vocal communication of the user. The second position is towards the front of the protective headgear relative to the first position by at least the defined distance. The first position within the cushioned bendable material at the inside of the top part of the protective headgear, the bone conduction microphone 304 is substantially isolated from other vibrational signals. The other vibration signals comprise signals resulting from wind impacting the headgear or from external environment sound generated outside of the headgear impacting the headgear. The external environment sound comprises motor sound generated by a motor or engine.

A speaker 310 outputs an audio signal received from the signal processor 324 representative of audio for a first region associated with the left ear of the user. Another speaker 310 outputs an audio signal from the signal processor 324 representative of second audio for a second region associated with the right ear of the user.

Figure 4A:
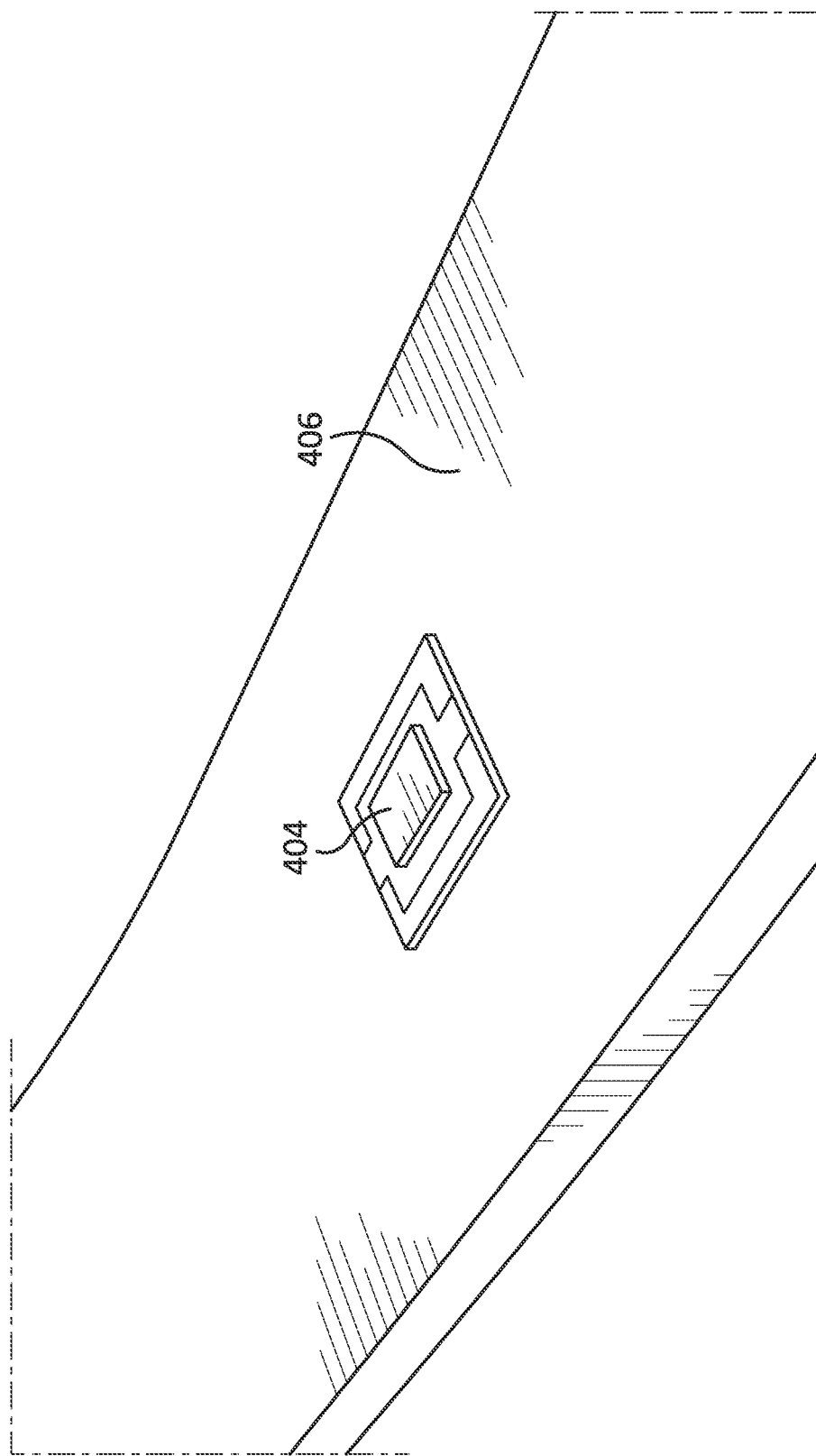
FIG. 4a illustrates the perspective view of the bone conduction sensor.
Figure 4B:
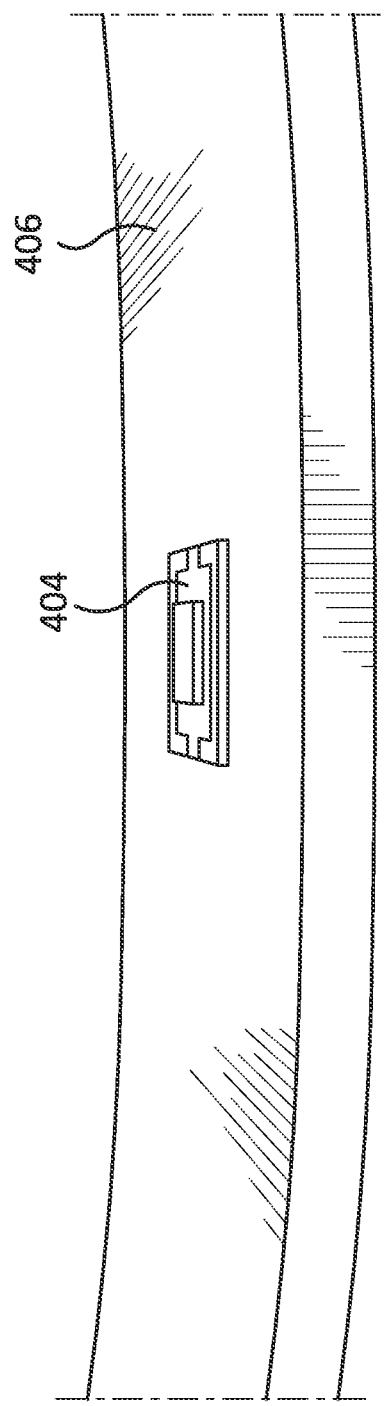
FIG. 4b illustrates the front view of the bone conduction sensor.
Figure 4C:
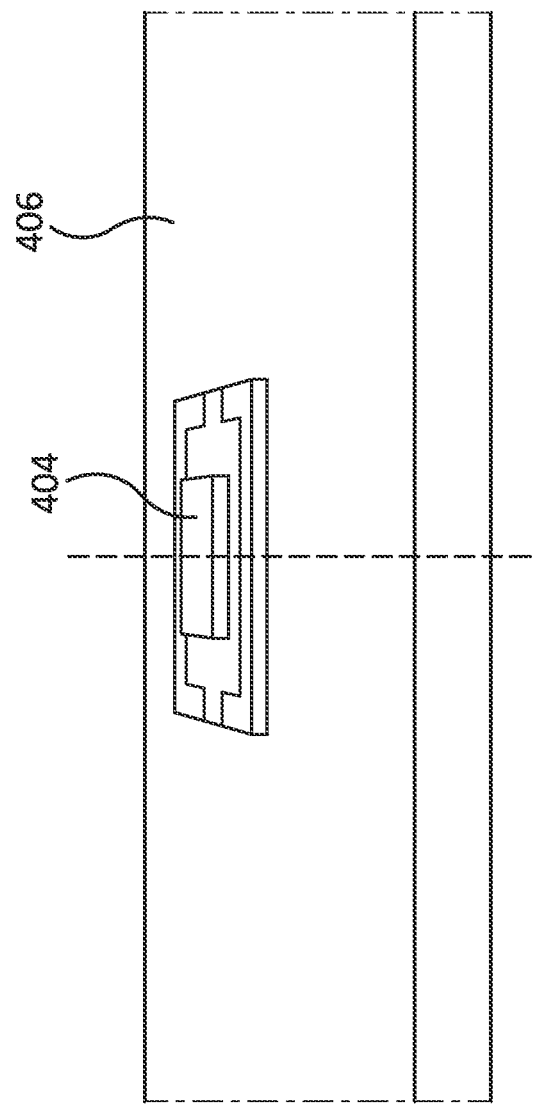
FIG. 4c illustrates a close up view of the view of the bone conduction sensor of FIG. 4b.

Referring to the example, non-limiting embodiments of FIGS. 4a, 4b, and 4c, a bone conduction microphone 404 is manually activated by touching the sensor to the vertex of the skull. The cushioned bendable material 406 can include electrical contacts that can be disposed around respective ends of the bone conduction microphone 404 to provide readings of communication. The encased bone conduction microphone 404 protrudes from the cutout in the compressible foam material to make a pressured contact with the head at the user vertex. In embodiments, the electrical contacts can comprise adhesive copper foil, conductive paint, conductive glue, or the like. Conductive wires can be used to provide electrical connections to electrical contacts by soldering or by means of conductive glue. The resistance change between wires can be converted to a voltage output by the circuitry.

The bone conduction microphone is embedded in the cushioned bendable material 406 and positioned to face a user vertex at a top portion of the user's skull. The bone conduction microphone 404 senses a vibration signal, representative of vocal sound from the user, from a corresponding vibration of the user vertex at the top portion of the skull. The bone conduction microphone 404 being embedded at the top portion substantially isolates the vibration signal sensed by the bone conduction microphone 404 from mechanical vibrations resulting from wind on the gear or air vibrations resulting from external sound on the gear from external environment sound generated outside of the gear. The bone conduction microphone being embedded in a compressible foam material comprises the bone conduction microphone being encased by at least one silicon layer, resulting in an encased bone conduction microphone 404 in the compressible foam material that makes contact with the user vertex through a cutout in the compressible foam material.

The air conduction microphone senses a sound signal representative of the vocal sound received from the user by air. The air conduction microphone is not comprised in the cushioned bendable material 406. The air conduction microphone is positioned away from the bone conduction microphone 404 in order to receive the vocal sound of the user by air.

The signal processing unit processes the vibration signal and the sound signal, to generate a combined signal representative of the vocal sound that substantially reduces at least one of a first noise associated with the vibration signal or a second noise associated with the sound signal, and that outputs the combined signal from the headgear apparatus to a device for further use or processing. The signal processing unit processes the vibration signal data and the tonal signal data to produce the combined data. The signal processing unit enhances a defined high frequency band of frequencies represented in at least the vibration signal data.

The combined signal is output from the head-protective helmet to a device for performing a command by the device associated with a voice command determined to be present in the vocal sound of the combined signal, storing the vocal sound by the other device, or communicating the vocal sound to at least one other device in communication with the device.

Figure 5:
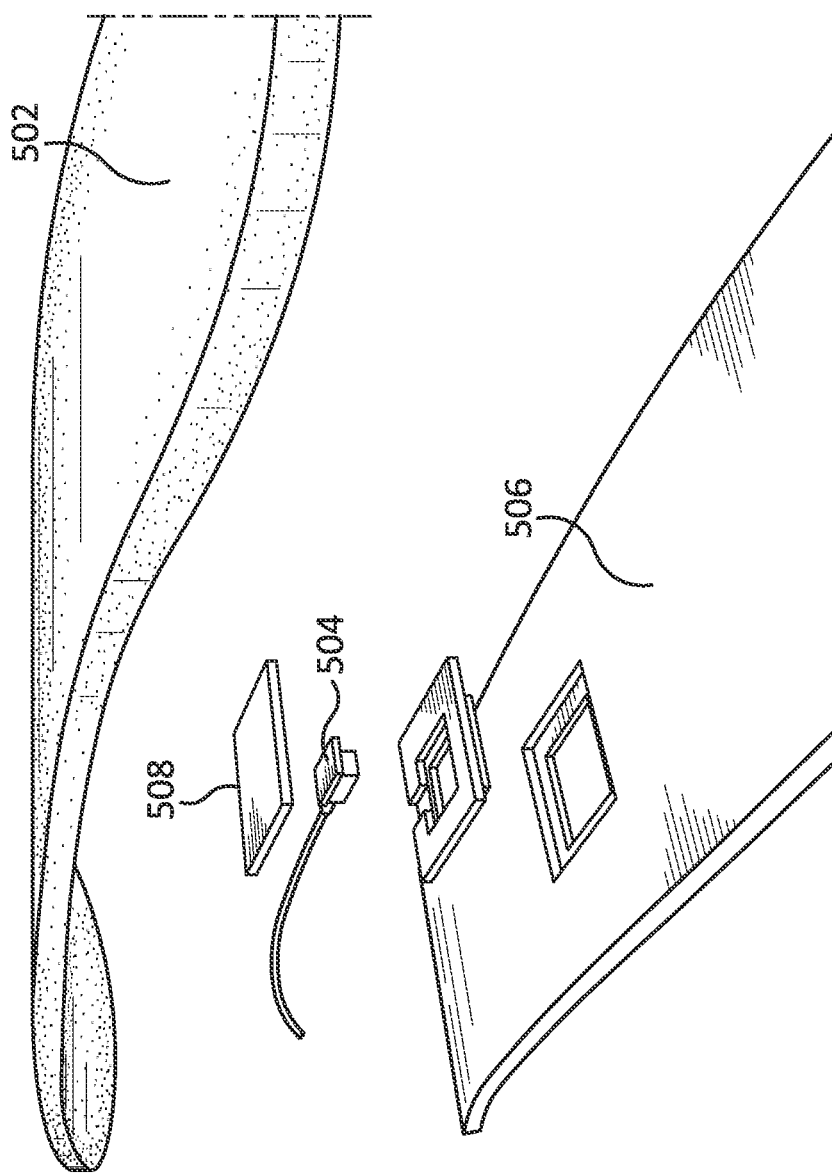
FIG. 5 illustrates the exploded view and how the sensor is embedded into the rubberized foam.

Referring to example embodiment of FIG. 5, the cushioned bendable material 506 comprises at least one rubberized foam layer 502 or at least one silicon casing layer 508. The bone conduction microphone 504 can be disposed, e.g., attachably mounted on a silicon casing layer 508 having a determined (first) thickness. The silicon casing layer 508 can be attachably mounted on a rubberized foam layer 502 of a determined (second) thickness. The second thickness of the rubberized foam layer 502 can be greater than the first thickness of the silicon casing layer 508. The silicon casing layer 508 can comprise an elastomer (e.g., silicone elastomer), a polymer, and the like. An external force can be applied to the bone conduction microphone 504 directly or indirectly. The rubberized foam layer 502, in response to a direct or indirect application of external force to the outer shell, can flex between the head-protective helmet and the silicon casing layer 508, and can generate an electric parameter (e.g., resistance) based on the external force applied. In embodiments, the electric parameter (e.g., resistance) generated can be proportional to the external force applied.

The range of measurement of external force by the bone conduction microphone 504 can be controlled by the relative thicknesses of the rubberized foam layer 502 and the silicon casing layer 508, e.g., the ratio of thicknesses of the rubberized foam layer 502. The sensitivity of the bone conduction microphone 504 and its dynamic range can be adjusted to a desired level by choosing the desired relative thicknesses (e.g., ratio) of the rubberized foam layer 502 and the silicon casing layer 508. The larger the relative thickness, the larger the dynamic range of measurements and smaller the sensitivity of the bone conduction microphone 504.

Further, the bone conduction microphone 504 characteristics can be highly repeatable and stable over a desired period of time because the bone conduction microphone 504 can be configured to regain its original size, shape, and resistance substantially instantly and substantially without creep. Also, the dynamic range and sensitivity of the bone conduction microphone 504 can be adjusted by choosing the thicknesses of the rubberized foam layer 502 and the silicon casing layer 508.

The bone conduction microphone 504 can be provided with adhesive to enable the bone conduction microphone 504 to be removably attached to the silicon casing layer 508. Adhesive material can be any well-known adhesive that would securely attach the bone conduction microphone 504 to the silicon casing layer 508 and enable it to be worn for a period of time, but that would also readily enable the multi-sensor array to be removed from the head-protective helmet. Adhesive material can comprise, for example, a double-sided adhesive foam backing that would allow for comfortable attachment to the head-protective helmet.

Figure 6A:
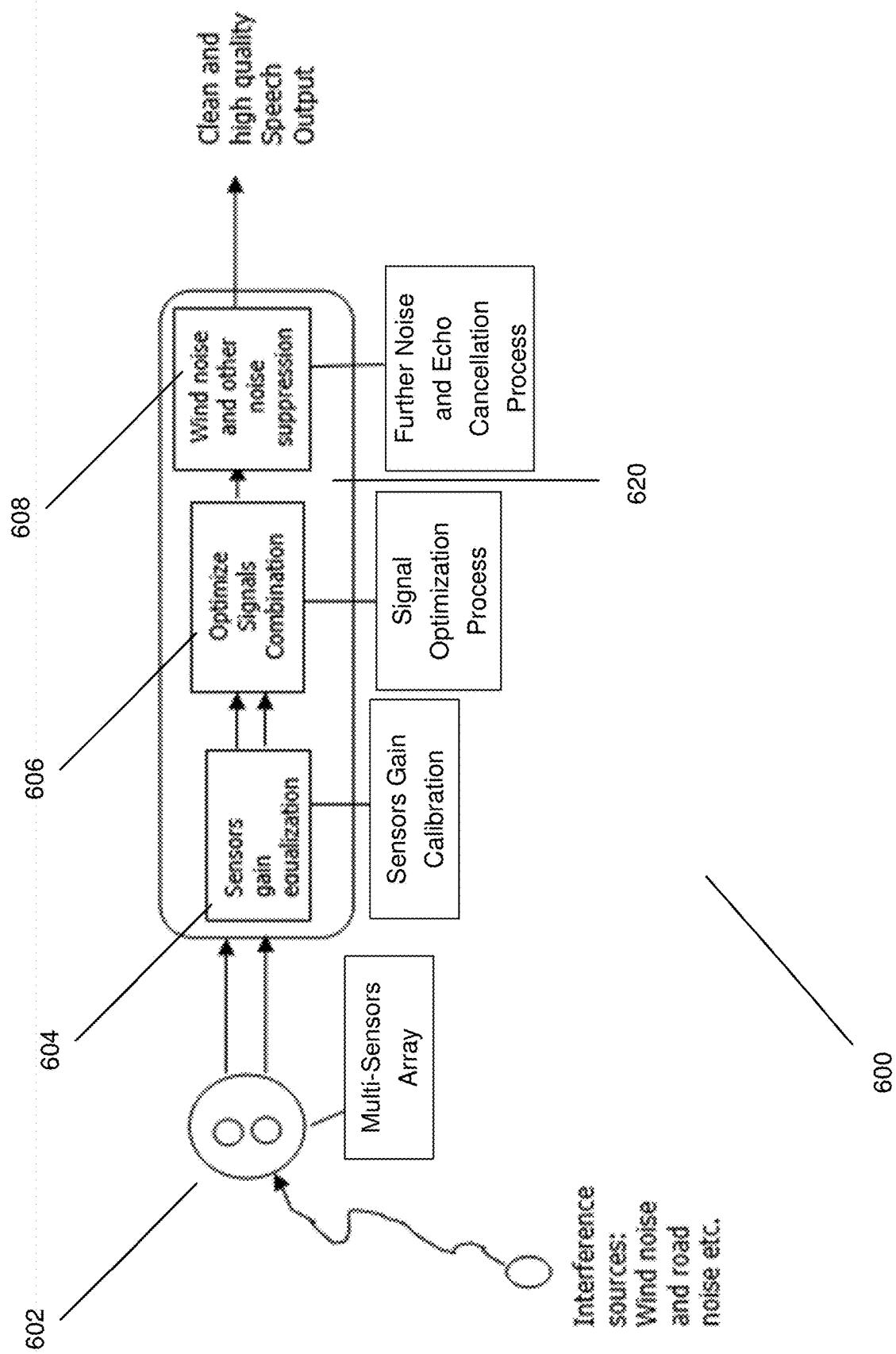
FIG. 6a illustrates a functional block diagram of the multi-sensor array.
Figure 6B:
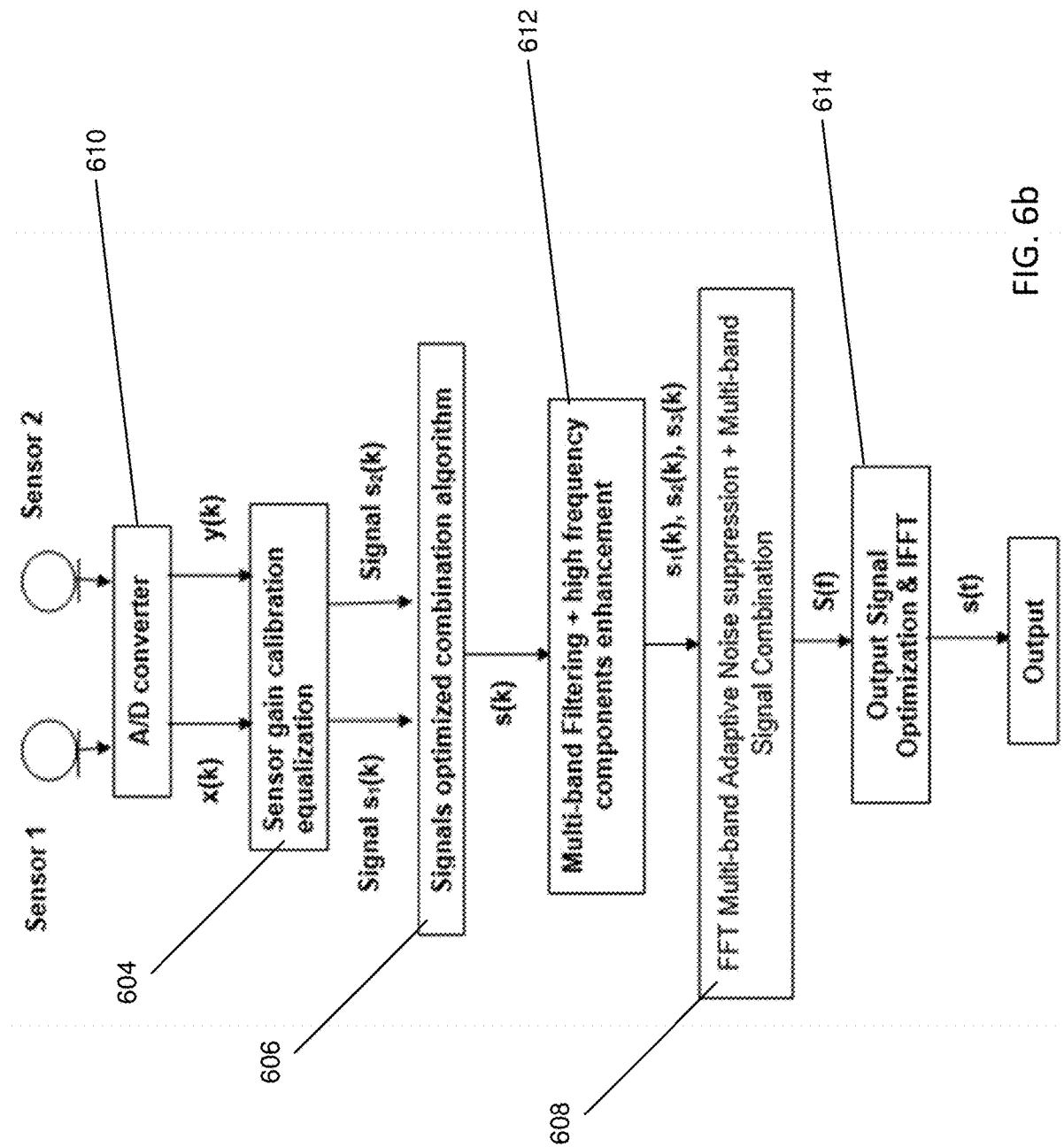
FIG. 6b illustrates a flow diagram in accordance with one or more embodiments described herein.

Turning now to FIGS. 6a and 6b, a process for outputting clean and high-quality speech output is shown. Process 600 can occur after input is received from the multi-sensor array 602. At 604, a gain equalization calibration is launched on the audio signal. At 606, a combination of the signal from the bone conduction microphone and the air conduction microphone occurs by applying a signal optimization algorithm. The signal processor 620 can include an acoustic echo canceller that removes or substantially removes, from the combined signal, echo signals that result from acoustic coupling between the bone conduction microphone and a speaker that renders the vocal communication of the user, or the air conduction microphone and the speaker.

Additional information or configuration settings or options can also be entered. At 608, a further noise and echo cancellation algorithm occurs to accomplish wind noise and other noise suppression. After completion of step 608, clean and high-quality speech can be output.

As shown in FIG. 6b, audio circuitry sometimes referred to as a codec or audio codec, can include an analog-to-digital (A/D) converter circuit 610. The analog-to-digital converter circuit can be used to digitize an analog signal, such as an analog audio signal. For example, analog-to-digital converter circuit 610 can be used to digitize one or more analog microphone signals. Such microphone signals can be received from the bone conduction microphone or the air conduction microphone. Digital-to-analog converter circuits can be used to generate the analog output signal. For example, a digital-to-analog converter circuit can include a digital signal corresponding to the audio portion of a media playback event, audio for a phone call, a noise canceling signal, a warning tone or signal (e.g., beep or ring), or any other digital information can be received. Based on this digital information, a digital-to-analog converter circuit can generate a corresponding analog signal (e.g., analog audio).

Process 600 can be used to perform digital signal processing on a digitized audio signal. The multi-sensor array 602 can also receive a digital audio voice signal. Using the processing functionality, the bone conduction microphone signal and the air conduction microphone signal can be digitally removed from the digital audio voice signal. The use of processing power of the device in this manner can help to reduce the processing burden. This makes it possible to configure with less cost and less complex circuitry. Power consumption efficiency and audio performance can also be improved. If desired, the digital audio processing circuitry can be used to supplement or replace the audio processing functionality. For example, digital noise canceling circuitry can be used to remove noise to the speaker.

Due to manufacturing tolerance and error, the bone conduction microphone and the air conduction microphone can be calibrated and their gain equalized. A gain equalization calibration 604 is applied to the bone conduction microphone and the air conduction microphone to ensure a consistency of gain of respective outputs with respect to one another.

The signals optimized combination algorithm 606 is used to optimize the output signal to achieve the best speech quality and intelligibility by intelligently combining the outputs from the two different types of sensors for both working in a noisy environment and quiet environment. This is achieved using the following algorithm: Let $|S_b(f)|$ be the fast fourier transform (FFT) of the bone conduction signal and Let $|S_a(f)|$ be the fast fourier transform (FFT) of the air conduction signal. Further, let $|S_{be}(f)|$ be the running average energy of the bone conduction signal, and $|S_{ae}(f)|$ be the running average energy of the air conduction signal. In a first case, if $|S_{be}(f)|$ is greater than $|S_{ae}(f)|$, then $$R_{ba} = \frac{|S_{be}(f)|}{|S_{ae}(f)|} \quad \text{Eq. (1)}$$

The optimized combination of the bone conduction signal and the air conduction signal is given as: $G_c = F(R_{ba})$ Eq. (2) where F(*) is a non-linear Fuzze function with $R_{ba}$ as its input. The optimized combined output is given as: $|S_{ab}(f)| = (1-\alpha^*G_c)^*|S_b(f)| + G_c^*|S_a(f)|$ Eq. (3) Where a is an empirically selected value, this value will typically close 1. This will prevent the value $(1-\alpha^*G_c)$ equal to zero if $G_c$ is equal to one. This happens when $R_{ba}$ is very large. This also applies to equation (5) below when $R_{ab}$ is very large. However, in a second case, if $|S_{be}(f)|$ is less than $|S_{ae}(f)|$, then:

$$R_{ab} = \frac{|S_{ae}(f)|}{|S_{be}(f)|} \quad \text{Eq. (4)}$$

In the second case, the optimized combination of the bone conduction signal and the air conduction signal is given as: $G_c=F(R_{ab})$, where F(*) is a non-linear Fuzze function with $R_{ab}$ as its input. And more particularly, in the second case, the optimized combined output is given as: $|S_{ab}(f)|=(1-\alpha*G_c)*|S_a(f)|+G_c*|S_b(f)|$ Eq. (5).

In the high frequency signal enhancement 612, the optimized combined output high frequency signal may still be weak. In this case, the output from the high frequency band of the filter is further amplified to enhance the high frequency portion of the speech signal. As illustrated in the flow diagram FIG. 6b, three frequency band filters can be applied, e.g., low, middle and high. In this case, the frequency components in the high frequency band are further enhanced.

There will still be some residual noise in the output of the optimized combined signal. An adaptive noise suppression technique, e.g., Output Signal Optimization 614 can be applied in this last stage to further reduce the noise to the minimum level.

Figure 7:
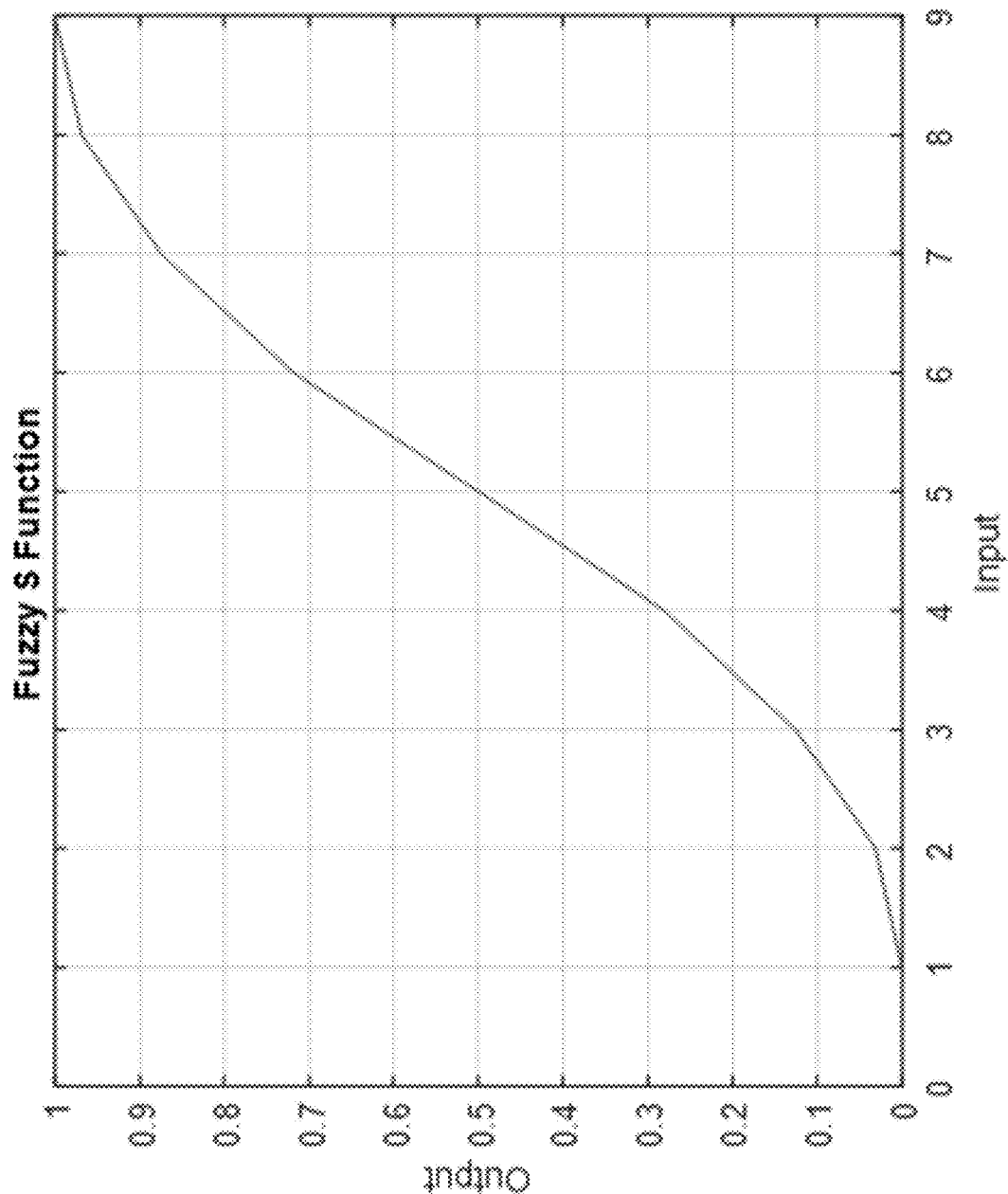
FIG. 7 illustrates a plot of a Fuzzy S Function having exemplary scenarios in which exemplary parameters are satisfied in accordance with one or more embodiments described herein.

Referring now to FIG. 7, a plot of a typical Fuzzy S Function is shown. The plot of a fuzzy S function shows the combination optimization of the multi-sensor signals. For example, in case one, if the average energy of the bone conduction microphone is larger than the average energy of the air conduction microphone, the ratio between the bone conduction sensor energy and air conduction sensor energy, Rba, will be a much larger one. When there is a larger $R_{ba}$ value, the output from the S function will be closer to one (1). As illustrated in equation (3), $G_c$ will also be closed to one (1), so the final combined signal will be contributed mainly by the air conduction microphone.

This same concept applies to equation (5) when the energy from the air conducted sensor is much larger than the bone conducted sensor. Therefore, when the energy is equal, the algorithm will take 50% of the bone conducted signal and combine with 50% of the air conducted signal.

In a motorcycle scenario, the motor noise, road noise, and wind noise will generally be picked up by the air conduction microphone. These types of noise will have less effect on the bone conduction microphone. The average energy from the air conduction microphone will be much larger than the bone conduction microphone. The system will output more signal from the bone conduction microphone, thereby the noise will be significantly reduced. However, in a quiet environment, the system will take more signal from the air conduction microphone rather than the bone conduction microphone so as to get a much better speech quality. As is well known, speech quality of an air conduction microphone is much better than the bone conduction microphone.

Figure 8:
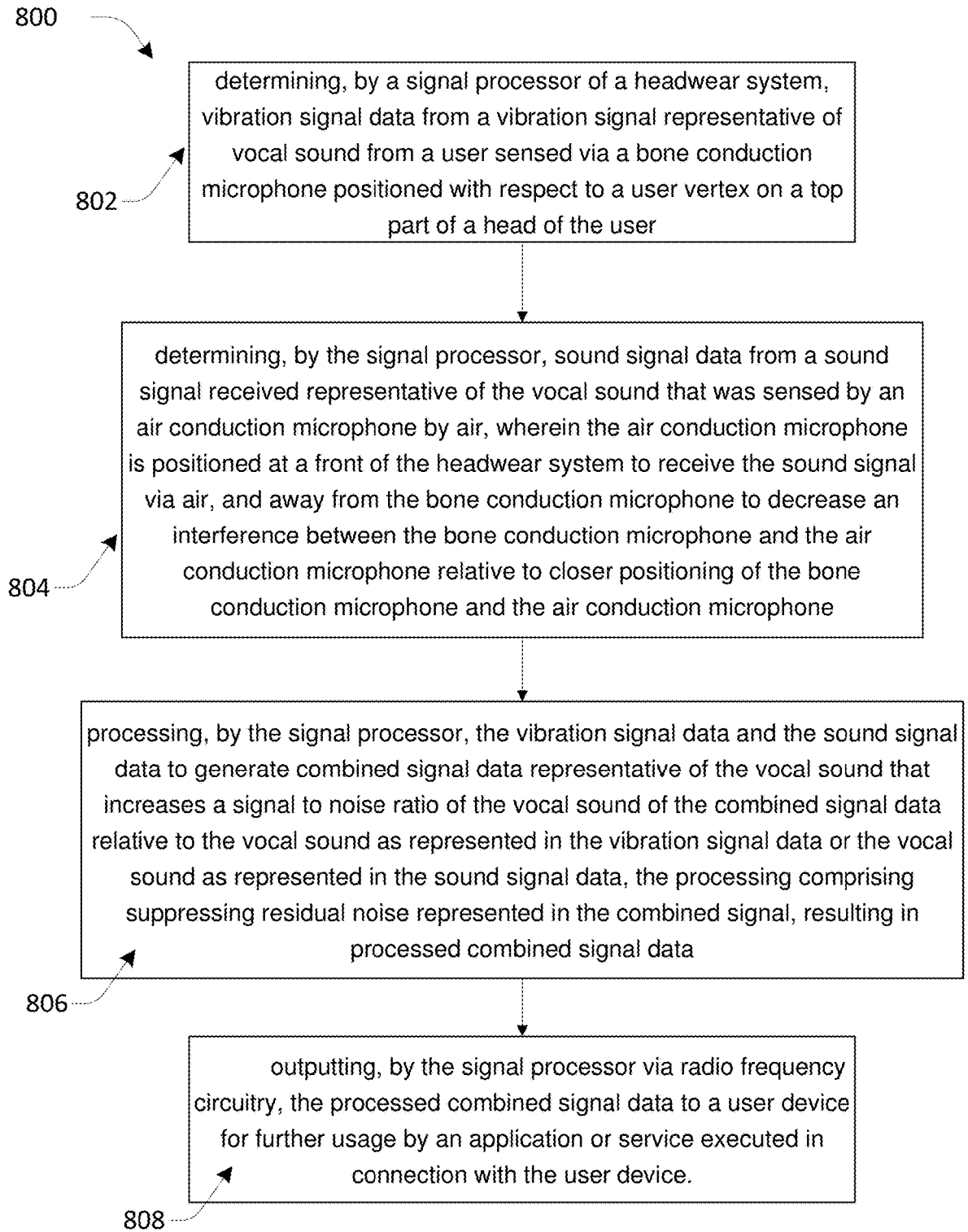
FIG. 8 is a block flow diagram for a method in which a helmet performs communication in extreme wind and environmental noise in accordance with one or more embodiments described herein.

Referring now to FIG. 8, illustrated is a flow diagram 800 for helmet communication in extreme wind and environmental noise in accordance with one or more embodiments described herein.

At 802, the flow diagram 800 comprises determining, by a signal processor of a headwear system, vibration signal data from a vibration signal representative of vocal sound from a user sensed via a bone conduction microphone positioned at the user's vertex on the top part of the user's head.

At 804, the flow diagram 800 comprises determining, by the signal processor, sound signal data from a sound signal received representative of the vocal sound that was sensed by an air conduction microphone by air, wherein the air conduction microphone is positioned at a front of the headwear system to receive the sound signal via air, and away from the bone conduction microphone to decrease an interference between the bone conduction microphone and the air conduction microphone relative to closer positioning of the bone conduction microphone and the air conduction microphone.

At 806, the flow diagram 800 comprises processing, by the signal processor, the vibration signal data and the sound signal data to generate combined signal data representative of the vocal sound that increases a signal to noise ratio of the vocal sound of the combined signal data relative to the vocal sound as represented in the vibration signal data or the vocal sound as represented in the sound signal data, the processing comprising suppressing residual noise represented in the combined signal, resulting in processed combined signal data.

At 808, the flow diagram 800 comprises outputting, by the signal processor via radio frequency circuitry, the processed combined signal data to a user device for further usage by an application or service executed in connection with the user device.

The communication in extreme wind and environmental noise can further comprise applying, by the signal processor, adaptive noise suppression to defined frequency bands of the combined signal for further suppression of noise represented in the combined signal.

The communication in extreme wind and environmental noise can further comprise applying, by the signal processor, high frequency enhancement of frequencies represented in the combined signal that are in a defined high frequency range.

Figure 9A:
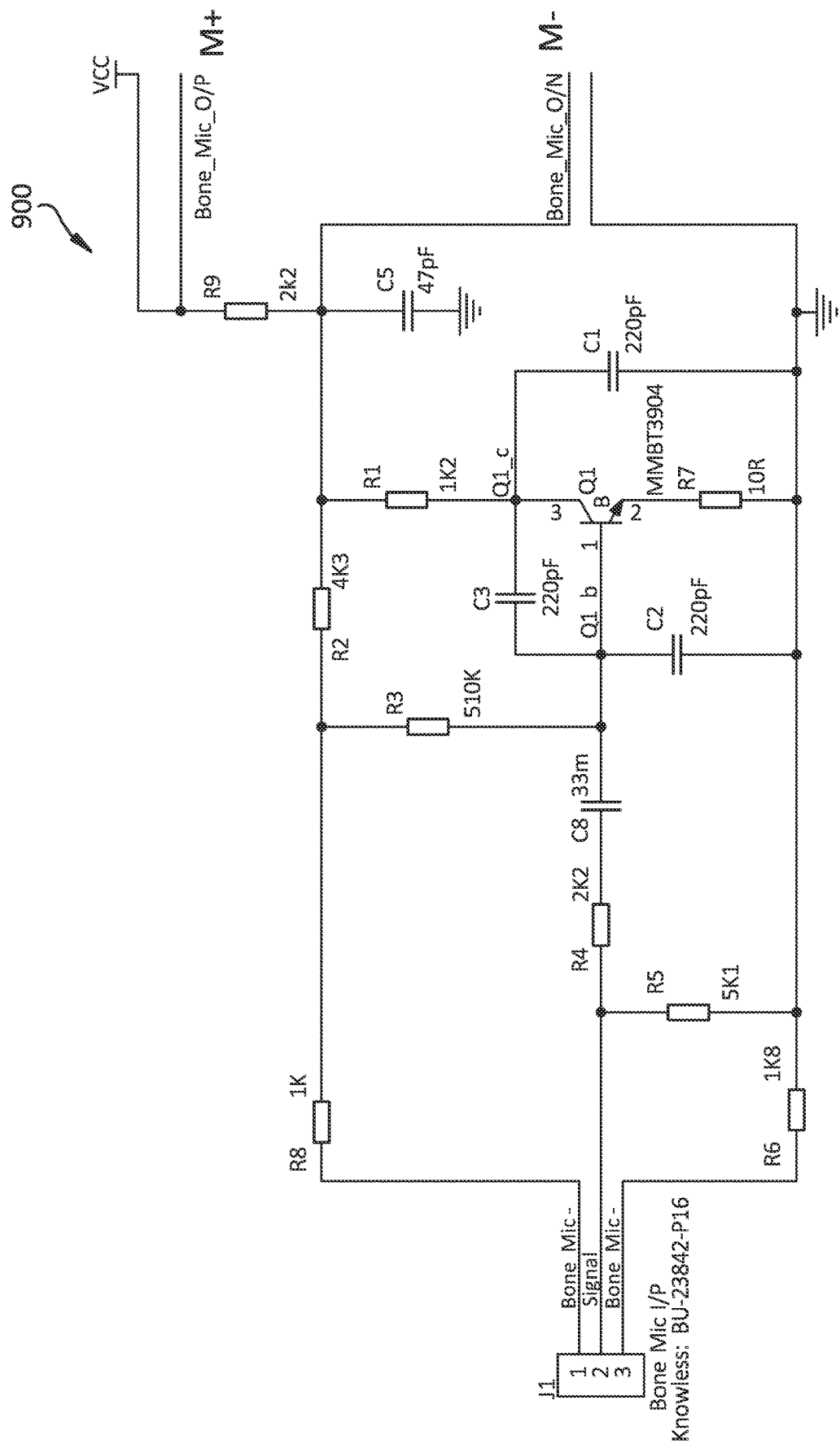
FIG. 9a illustrates a bone conduction microphone amplifier schematic diagram.
Figure 9B:
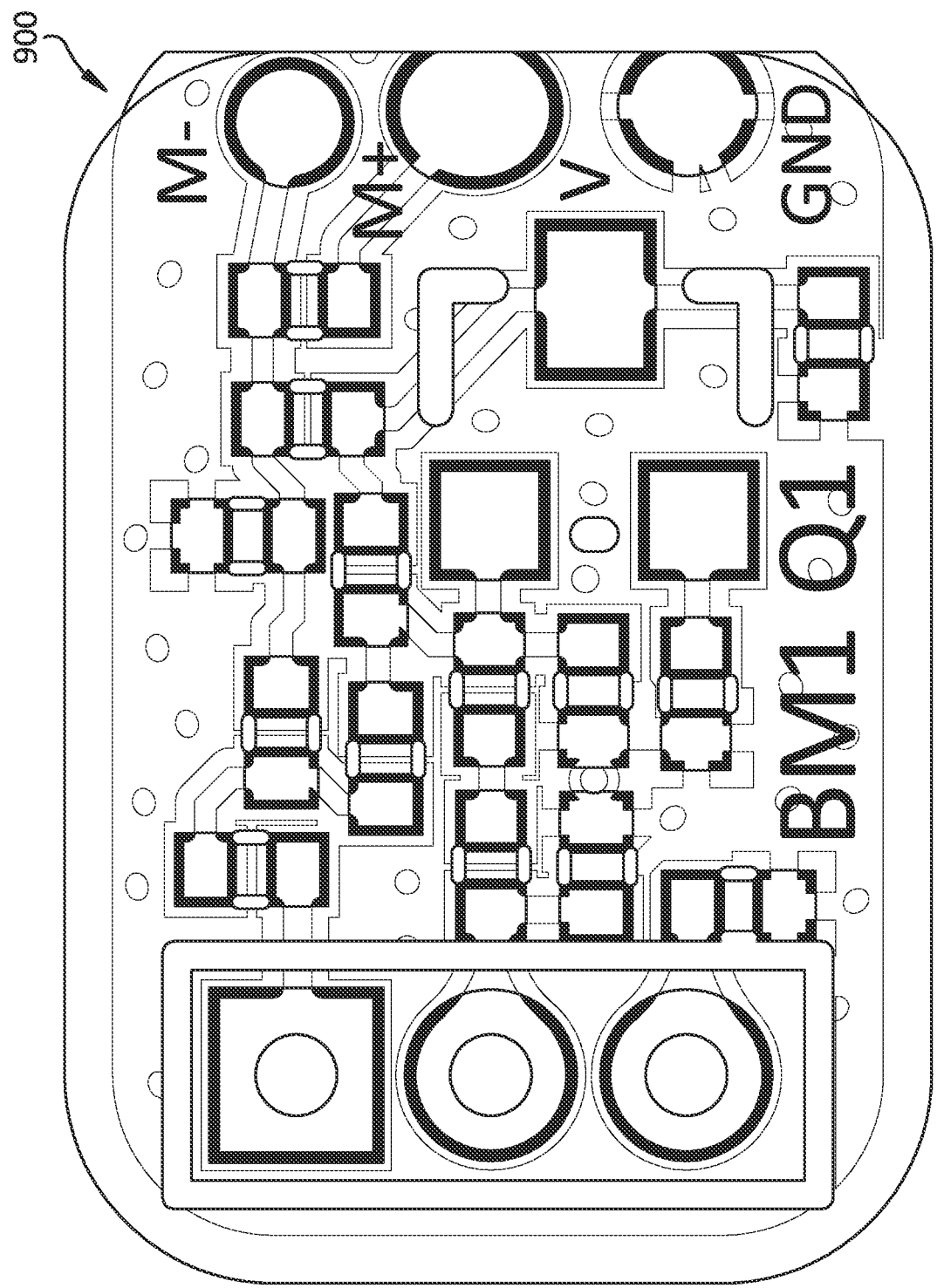
FIG. 9b illustrates a layout of the bone conduction microphone amplifier.

Referring now to FIGS. 9a and 9b, the unique bone conduction sensor amplifier design 900 allows for the bone conduction microphone to be placed away from the transceiver radio frequency source so as to significantly reduce radio frequency interference and yet be able to provide a clean signal output to the processor board.

Figure 10:
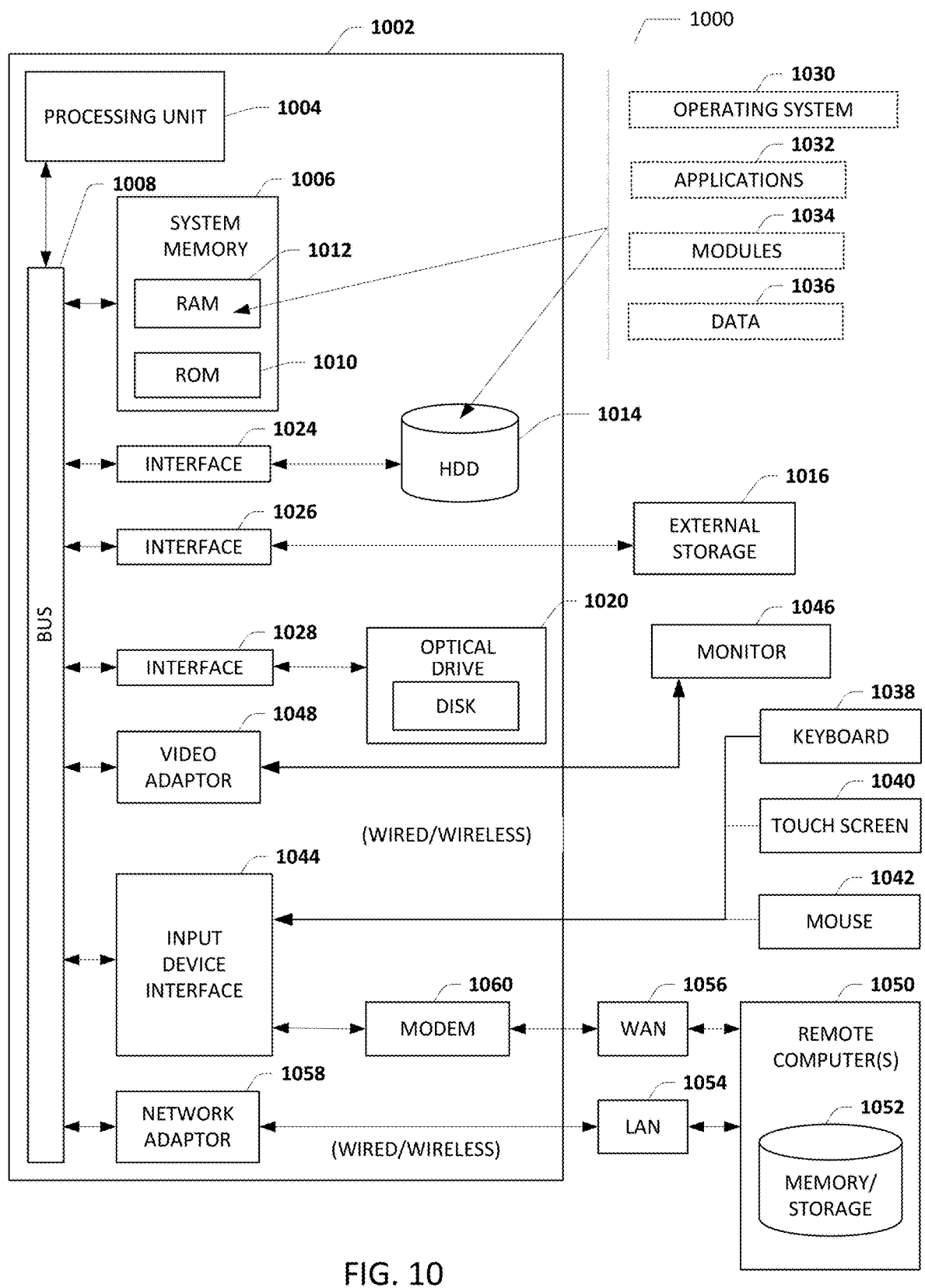
FIG. 10 illustrates a non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
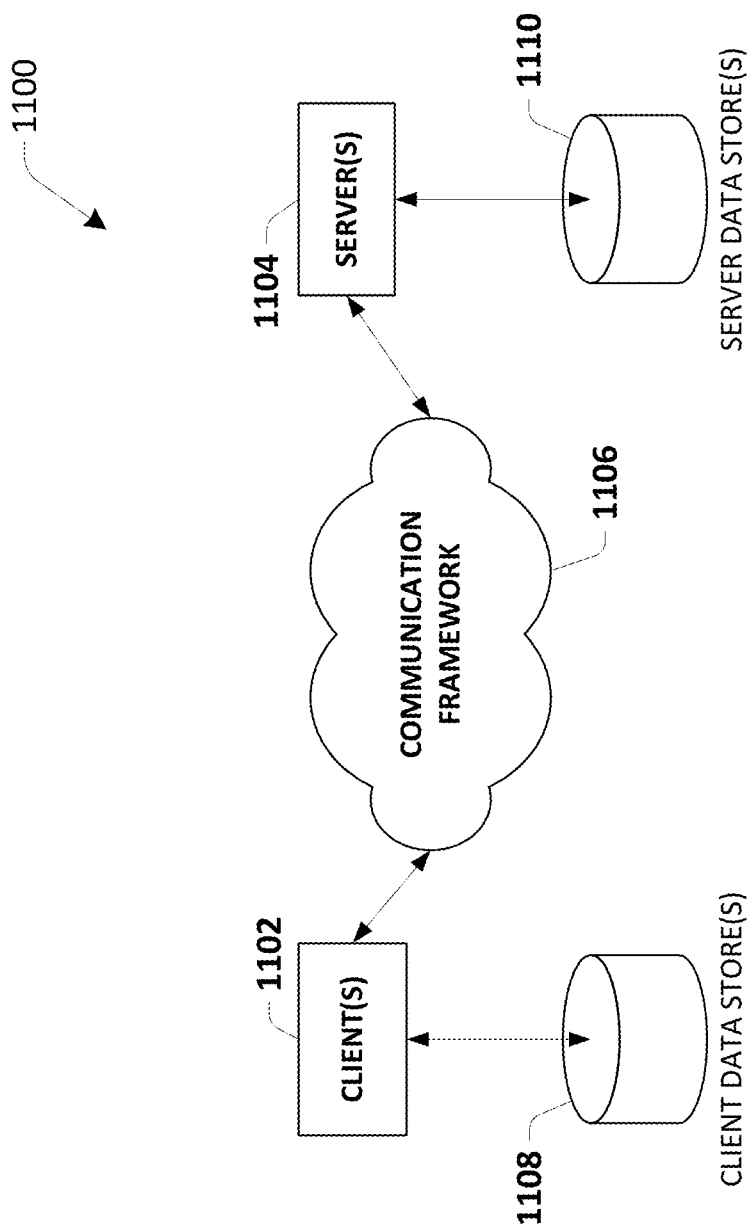
FIG. 11 illustrates a non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets can include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary implementation, a client 1102 can transfer an encoded file, (e.g., encoded media item), to server 1104. Server 1104 can store the file, decode the file, or transmit the file to another client 1102. It is to be appreciated, that a client 1102 can also transfer uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, e.g., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. An apparatus integral with, or attachable to, a protective headgear, comprising:
    a cushioned bendable material integral with, or attachable to, an inside of a top part of the protective headgear;
    a bone conduction microphone, at a first position within the cushioned bendable material, that obtains vibration signal data representative of a vibration signal associated with vibration of a user vertex area of skull bone of a user, wherein the user vertex area of skull bone is located at a top part of skin of a head of the user that contacts or substantially contacts the bone conduction microphone, and wherein the vibration signal results from vocal communication of the user;
    an air conduction microphone integral with, or attachable to, the protective headgear at a second position away from the first position of the bone conduction microphone by at least a defined distance, wherein the air conduction microphone obtains tonal signal data representative of a tonal signal, received by the air conduction microphone via air and representative of the vocal communication of the user; and
    a signal processor that processes the vibration signal data and the tonal signal data, to produce combined data representative of the vocal communication that substantially reduces or eliminates at least one of a first noise associated with the vibration signal data or a second noise associated with the tonal signal data, wherein, prior to producing a combined signal, a gain equalization is applied to the bone conduction microphone and the air conduction microphone to ensure a consistency of gain of respective outputs with respect to one another.

2. The apparatus of claim 1, further comprising:
    a wind sensor that senses wind signal data representative of an air noise signal resulting from incident air flow on the protective headgear, and wherein the signal processor processes the vibration signal data, the tonal signal data, and the wind signal data to produce the combined data representative of the vocal communication that substantially reduces or eliminates at least one of the first noise associated with the vibration signal data, the second noise associated with the tonal signal data, or a third noise associated with the wind signal data.

3. The apparatus of claim 1, wherein the second position is toward a front of the protective headgear relative to the first position by at least the defined distance, wherein, at the first position within the cushioned bendable material at the inside of the top part of the protective headgear, the bone conduction microphone is substantially isolated from other vibrational signals, wherein the other vibration signals comprise signals resulting from wind impacting the headgear or from external environment sound generated outside of the headgear impacting the headgear, and wherein the external environment sound comprises motor sound generated by a motor or engine.

4. The apparatus of claim 1, further comprising:
a radio frequency transmitter to transmit the vocal communication by the user to another device; and
a radio frequency receiver to receive other communications from the other device, wherein the other device is a user equipment or Internet of Things device.

5. The apparatus of claim 4, wherein the position of the bone conduction microphone within the cushioned bendable material and the bone conduction sensor facing the top part of the head corresponding to the user vertex isolates the bone conduction microphone from interference from the radio frequency transmitter or the radio frequency receiver.

6. The apparatus of claim 1, further comprising:
a first speaker that outputs a first audio signal received from the signal processor representative of first audio for a first region associated with a left ear associated with the head; and
a second speaker that outputs a second audio signal from the signal processor representative of second audio for a second region associated with a right ear associated with the head.

7. The apparatus of claim 1, wherein the signal processor comprises an acoustic echo canceller that removes or substantially removes, from the combined signal, echo signals that result from acoustic coupling between at least one of the bone conduction microphone and a speaker that renders the vocal communication of the user, or the air conduction microphone and the speaker.

8. The apparatus of claim 1, wherein the cushioned bendable material comprises at least one of at least one rubberized foam layer or at least one silicon casing layer.

9. The apparatus of claim 1, wherein the vibration signal data is represented as a first fast fourier transform of the vibration signal, wherein the tonal signal data is represented as a second fast fourier transform of the tonal signal, and wherein the signal processor processing the vibration signal data and the tonal signal data to produce the combined data comprises the signal processor determining whether a first running average energy of the vibration signal is greater than a second running average energy of the tonal signal.

10. The apparatus of claim 9, wherein the signal processor processing the vibration signal data and the tonal signal data to produce the combined data further comprises,
in response to the first running average energy being determined to be greater than the second running average energy, applying a non-linear Fuzze function of the second running average energy divided by the first running average energy.

11. The apparatus of claim 9, wherein the signal processor processing the vibration signal data and the tonal signal data to produce the combined data further comprises,
in response to the first running average energy being determined to be less than the second running average energy, applying a non-linear Fuzze function of the first running average energy divided by the second running average energy.

12. A headgear apparatus, comprising:
compressible foam material attachable to a top part of gear that is wearable by a head of a user, the compressible foam material comprising:
a bone conduction microphone embedded in the compressible foam material and positioned to face a user vertex at a top portion of a skull of the user, wherein the bone conduction microphone senses a vibration signal, representative of vocal sound from the user, from a corresponding vibration of the user vertex at the top portion of the skull, wherein the bone conduction microphone being embedded at the top portion substantially isolates the vibration signal sensed by the bone conduction microphone from mechanical vibrations resulting from wind on the gear or air vibrations resulting from external sound on the gear from external environment sound generated outside of the gear;
an air conduction microphone that senses a sound signal representative of the vocal sound received from the user by air, wherein the air conduction microphone is not comprised in the compressible foam material, and wherein the air conduction microphone is positioned away from the bone conduction microphone in order to receive the vocal sound of the user by air; and
a signal processing unit that processes the vibration signal and the sound signal, to generate a combined signal representative of the vocal sound that substantially reduces at least one of a first noise associated with the vibration signal or a second noise associated with the sound signal, and that outputs the combined signal from the headgear apparatus to a device for further use or processing, wherein, prior to producing the combined signal, a gain equalization is applied to the bone conduction microphone and the air conduction microphone to ensure a consistency of gain of respective outputs with respect to one another.

13. The headgear apparatus of claim 12, wherein the signal processing unit processing the vibration signal data and the tonal signal data to produce the combined data comprises the signal processing unit enhancing a defined high frequency band of frequencies represented in at least the vibration signal data.

14. The headgear apparatus of claim 12, wherein the combined signal is output from the headgear apparatus to the device for at least one of performing a command by the device associated with a voice command determined to be present in the vocal sound of the combined signal, storing the vocal sound by the device, or communicating the vocal sound to at least one other device in communication with the device.

15. The headgear apparatus of claim 12, wherein the bone conduction microphone being embedded in the compressible foam material comprises the bone conduction microphone being encased by at least one silicon layer, resulting in an encased bone conduction microphone in the compressible foam material that makes contact with the user vertex through a cutout in the compressible foam material.

16. The headgear apparatus of claim 15, wherein the encased bone conduction microphone protrudes from the cutout in the compressible foam material to make a pressured contact with the head at the user vertex.

17. A method, comprising:
determining, by a signal processor of a headwear system, vibration signal data from a vibration signal representative of vocal sound from a user sensed via a bone conduction microphone positioned with respect to a user vertex on a top part of a head of the user;
determining, by the signal processor, sound signal data from a sound signal received representative of the vocal sound that was sensed by an air conduction microphone by air, wherein the air conduction microphone is positioned at a front of the headwear system to receive the sound signal via air, and away from the bone conduction microphone to decrease an interference between the bone conduction microphone and the air conduction microphone relative to closer positioning of the bone conduction microphone and the air conduction microphone;

processing, by the signal processor, the vibration signal data and the sound signal data to generate combined signal data representative of the vocal sound that increases a signal to noise ratio of the vocal sound of the combined signal data relative to the vocal sound as represented in the vibration signal data or the vocal sound as represented in the sound signal data, the processing comprising suppressing residual noise represented in the combined signal, resulting in processed combined signal data;

prior to producing the combined signal data, applying, by the signal processor, a gain equalization to the bone conduction microphone and the air conduction microphone to ensure a consistency of gain of respective outputs with respect to one another; and outputting, by the signal processor via radio frequency circuitry, the processed combined signal data to a user device for further usage by an application or service executed in connection with the user device.

18. The method of claim 17, further comprising applying, by the signal processor, adaptive noise suppression to defined frequency bands of the combined signal for further suppression of noise represented in the combined signal.

19. The method of claim 17, further comprising applying, by the signal processor, high frequency enhancement of frequencies represented in the combined signal that are in a defined high frequency range.

20. The method of claim 17, further comprising, removing, by an acoustic echo canceller, echo signals from the combined signal that result from acoustic coupling between at least one of the bone conduction microphone and a speaker that renders the vocal communication of the user, or the air conduction microphone and the speaker.

* * * * *